(12) United States Patent
Hennessy

(10) Patent No.: US 8,141,179 B2
(45) Date of Patent: Mar. 27, 2012

(54) WATER SAVER TOILET WITH UNIFORM WATER SPOT

(75) Inventor: Philip Hennessy, Frankford (CA)

(73) Assignee: P & C Hennessy Holdings, Inc. (CA)

( * ) Notice: Subject to any disclaimer, the term of this patent is extended or adjusted under 35 U.S.C. 154(b) by 43 days.

(21) Appl. No.: 12/802,184

(22) Filed: Jun. 1, 2010

(65) Prior Publication Data

US 2011/0289669 A1    Dec. 1, 2011

(51) Int. Cl.
*E03D 1/06* (2006.01)
(52) U.S. Cl. .......................................................... 4/328
(58) Field of Classification Search .............. 4/328, 420, 4/354, 415, 362–363
See application file for complete search history.

(56) References Cited

U.S. PATENT DOCUMENTS

| | | | | |
|---|---|---|---|---|
| 5,142,712 A | * | 9/1992 | Hennessy | 4/431 |
| 2009/0144889 A1 | * | 6/2009 | Hennessay | 4/420 |

* cited by examiner

*Primary Examiner* — Lori Baker
(74) *Attorney, Agent, or Firm* — Leon D. Rosen

(57) ABSTRACT

A toilet has a source (42) that applies a vacuum to a trapway (14) at the beginning of a flushing to immediately flush the toilet bowl (12). As a result, water from the water tunnel 26 and the toilet bowl top channel 28 flow into the bowl after the flushing to create a large water spot (98) in the toilet bowl. A low water flush (e.g. 1½ liters to flush urine) can be obtained by not letting water flow out of a secondary volume (63) that lies outside a divider (140) in an isolator (40).

3 Claims, 3 Drawing Sheets

WATER SAVER TOILET WITH UNIFORM WATER SPOT

BACKGROUND OF THE INVENTION

Conventional toilets create a water spot in the toilet bowl at the end of each flushing, by using a refill valve that dispenses some water to the toilet bowl. In a water saver toilet, care must be taken in its design to assure a water spot of sufficient size.

It is possible to save water when flushing only urine by using perhaps 1.5 liters instead of 3 liters in a water saver toilet flushing. However, when less water is flushed, less water may be available to create a water spot. A toilet that enabled a good flushing with only about 1.5 liters of water, and that provided a sufficiently large toilet bowl spot would be of value.

SUMMARY OF THE INVENTION

In accordance with one embodiment of the present invention, a water saver toilet is provided that includes a water source which reliably provides a water spot in the toilet bowl. A full flush (e.g. 3 liters) or a low water flush (e.g. 1½ liters) can be selected. In either case, the toilet bowl is flushed immediately after the flush valve is operated. After the flushing has been completed, water lying in the water tunnel and in the toilet bowl top channel, continues to flow towards the toilet bowl to produce a uniform water spot size.

An isolator lies in the toilet tank around the flush valve, with almost 3 liters of water in the isolator. A divider lies in the isolator and only about one liter of water lies on each side of the isolator.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
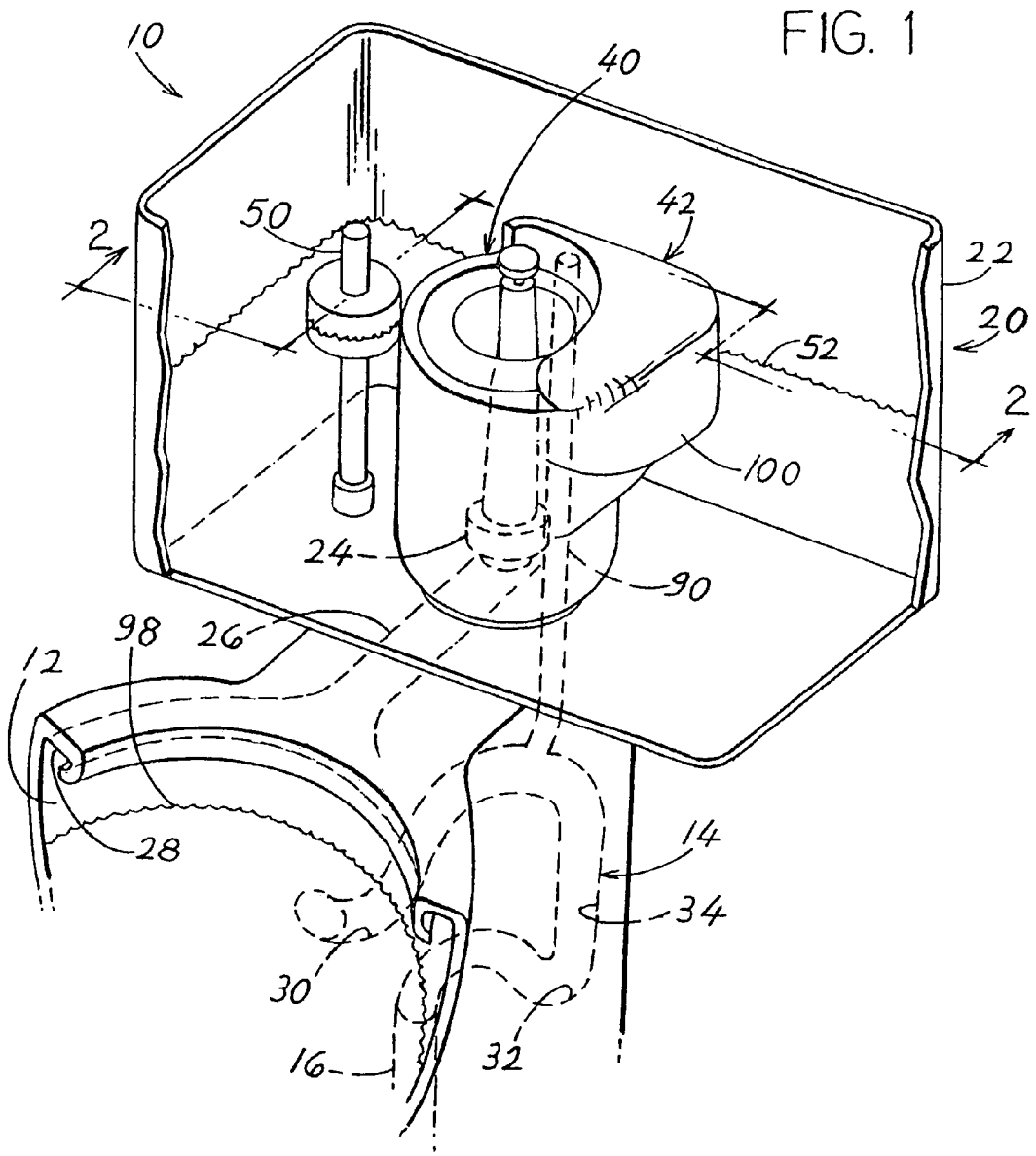
FIG. 1 is a partial isometric view of a toilet of the present invention with part of the toilet tank cut away.

FIG. 1 shows a toilet 10 of the present invention, which includes a pottery section comprising a toilet bowl 12 that contains a water spot 98. A trapway 14 leads from the toilet bowl to a drain 16. A water supply 20 includes a water tank 22. A flush valve 24 in the water tank rapidly discharges water that has been stored within an isolator 40 that lies in the tank. During a flushing, discharged water flows through the water tunnel 26, through a channel 28 at the top of the toilet bowl, and through openings in the channel into the toilet bowl. The trapway includes upper and lower traps 30, 32 and a trapway passage 34 that extends between them. The water supply 20 includes the isolator 40 and an air-water source 42 that both lie in the tank 22, and that are part of a single structure. A refill valve 50 slowly admits water into the tank after each flushing, until the water level in the tank reaches a tank filled level 52. The flush valve 24 lies in the bottom of the isolator 40 which lies within the tank, so the flush valve lies in close proximity to third and fourth quantities of water (58 and 61, FIG. 2) that flows through the flush valve. In other words, most of the water dispensed through the flush valve in each flushing is water that has laid in the isolator.

Figure 2:
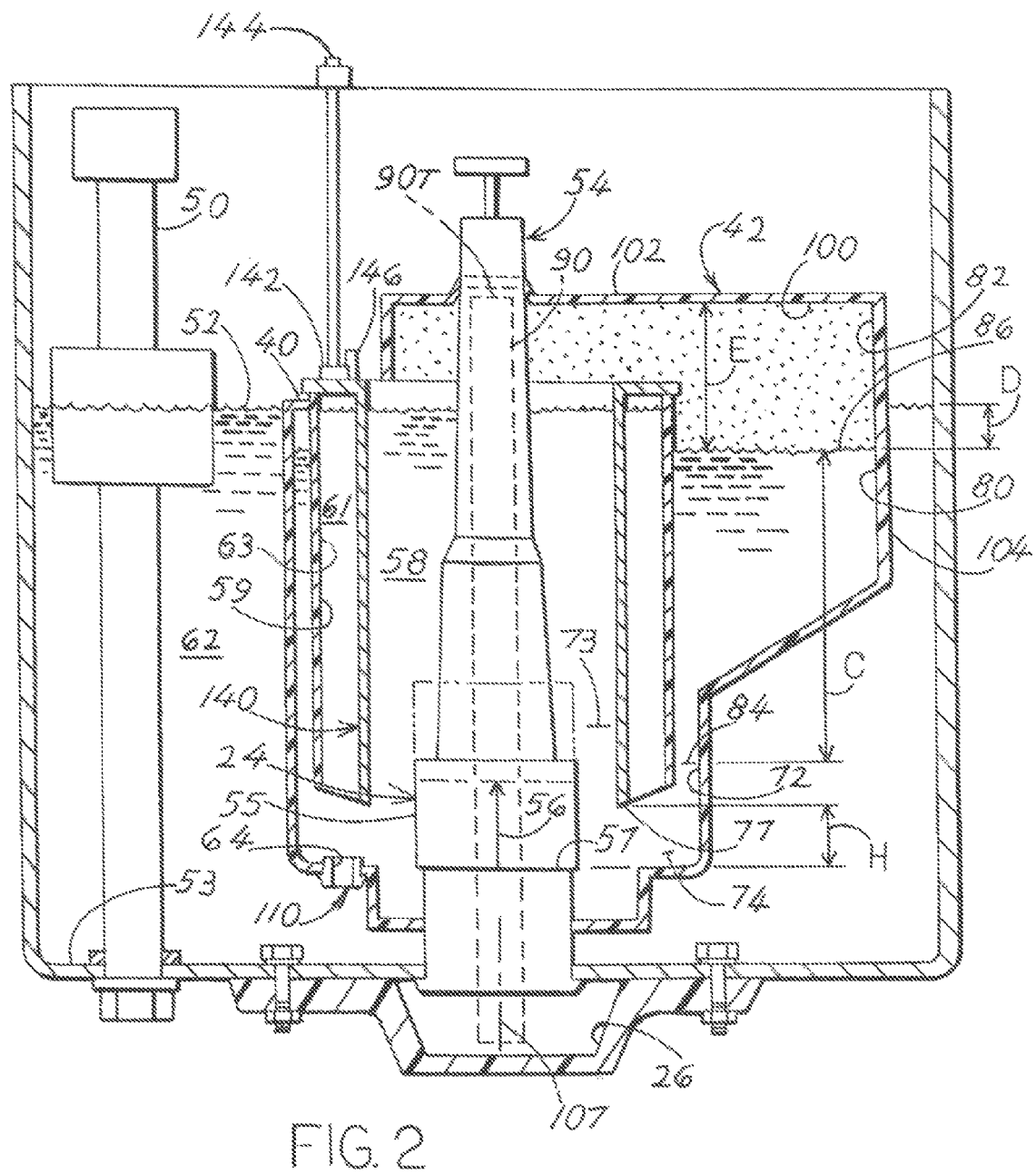
FIG. 2 is a sectional front view of the upper portion of the toilet of FIG. 1, taken on line 2-2 of FIG. 1.

FIG. 2 shows that the flush valve 24 includes a mechanism 54 that is operated to raise a flush valve member 55, as indicated by arrow 56, off a flush valve seat 57. When the flush valve member is raised, it floats above the valve seat until the water level in the isolator falls to a low level, and the flush valve member then closes. Much of the water released in each flushing is the third flush quantity 58 that lies in the isolator around the flush valve 24. In a full flush (that uses 3 liters of water) a fourth quantity of water 61 within the isolator 40 also flows through a region 74 to the flush valve. The isolator 40 preferably extends above the filled tank height 52. Very little flush water is water from the surrounding tank region 62 that passes slowly into the isolator though a tank-isolator hole 64.

Additional water used in each flushing comes through a passage 72 from a container 100 of an air-water source 42 that generates air pressure and a vacuum in its upper portion. The passage 72 preferably extends more than 180° around the flush valve, with the passage 72 actually extending completely around the isolator 40. The water level 86 in the container 100 drops near the beginning of a flushing to the level 84 or slightly above 84. The drop in water level in container 100 results in the creation of a vacuum. The vacuum is transmitted through a top 90T of a conduit 90 to the trapway 14 (FIG. 1) to apply a vacuum to the toilet bowl. The vacuum creates a syphon that very rapidly (usually within 2 seconds) flushes the toilet bowl, that is, it rapidly draws out the contents of the toilet bowl. When the syphon breaks, at the end of a flushing, water in the water tunnel 26 (FIG. 1) and toilet bowl channel 28 continue to flow towards the inside of the toilet bowl, and create a water spot 98. After each flushing, the refill valve 50 refills the tank, and the level of water in the isolator and in the container are restored to their original levels.

Applicant provides an option to the user, to produce a low water flush of about 1½ liters, instead of a full flush of about 3 liters. A divider 140 (FIG. 2) isolates the fourth volume 61 that lies within the isolator 40 but outside the divider, to isolate the fourth volume 61 from the third, or main flush volume 58. An isolator outer wall 59 extends 360° around the volume 61. If a button 144 is operated to open a selection valve 142 so air can flow in through an inlet 146 during a flushing (and therefore the fourth volume 61 is vented), then water in the fourth volume 61 will be dispensed together with water in volume 58. In addition, some water from the air-water source 42 will be used in a flushing. Applicant finds that with a low water flush of about 1½ liters, a flushing is completed in one to one-and-one-half seconds (and water flows into the bowl to restore the water spot 98 immediately afterwards).

Instead of opening the selection valve 142 to allow or not allow air to flow out of the fourth volume 61 in each flushing, it is possible to use a valve at 142 that is closed after a flushing. This prevents the volume 61 from filling with water prior to a flushing, so all flushings are low water flushes unless the valve 142 is opened about 30 seconds before the next flushing.

Prior art water saver toilets relied solely on the refill valve 50 to provide water that restores the water spot in the toilet bowl. However, in that case a partial flush (1.5 liters) would result in only about half the full amount (3 liters) of water flowing from the refill valve 50 to the toilet tank 22 to refill it. The limited amount of refill water reaching the toilet bowl would result in too small a water spot.

For the water saver toilet of FIG. 2, about one liter flows out the third volume 58 during a flushing and an additional about one liter flows out of the fourth volume 61 if the flushing is a full flushing. An additional one-half to three quarters liter flows from the air-water source 42 into the toilet bowl regardless of whether there is a partial or full flush.

It is important to assure that both the third and fourth volumes of water 58, 61 rapidly flow out through the flush valve at the beginning of a full flushing. Applicant does this by placing the two volumes 58, 61 so they lie concentric about an axis 107 on which the flush valve lies. The isolator 40 surrounds the flush valve axis 107 and the divider lies within the isolator and around the flush valve axis. The passage 72 of the source 42 is also closely coupled to the flush valve. Applicant places the open lower end 77 of the divider 61 and of the source passage 72 a small distance H of one to two centimeters above the flush valve seat 57. This permits early rapid flow of water to the valve seat and prevents air from reaching the valve seat. The flush valve 24 closes when water in the isolator reaches a level 73 which is about 10 millimeters above 77. The lower end 77 of the source passage 72 lies below the water level 73 at which the flush valve closes.

The container 100 serves as a pressured air source between flushings and serves as a vacuum source during an early stage of each flushing. The container 42 has a cavity 80 with an upper portion 82 and a top wall 102 that stores pressured air prior to each flushing. During each refill of the toilet tank, when the water level rises from near a low container level 84 to the container fill level 86, air in the container upper portion 82 becomes compressed. The level 86 lies a distance E below the container top wall 102, and lies a distance D below the tank fill level. A typical pressure in upper portion 82 is 1.5 centimeters of water (the pressure at the bottom of a column of water 1.5 cm high), which is about 0.02 psi. A conduit 90 connects the upper portion of the cavity to the trapway passage that extends between the upper and lower traps.

Figure 3:
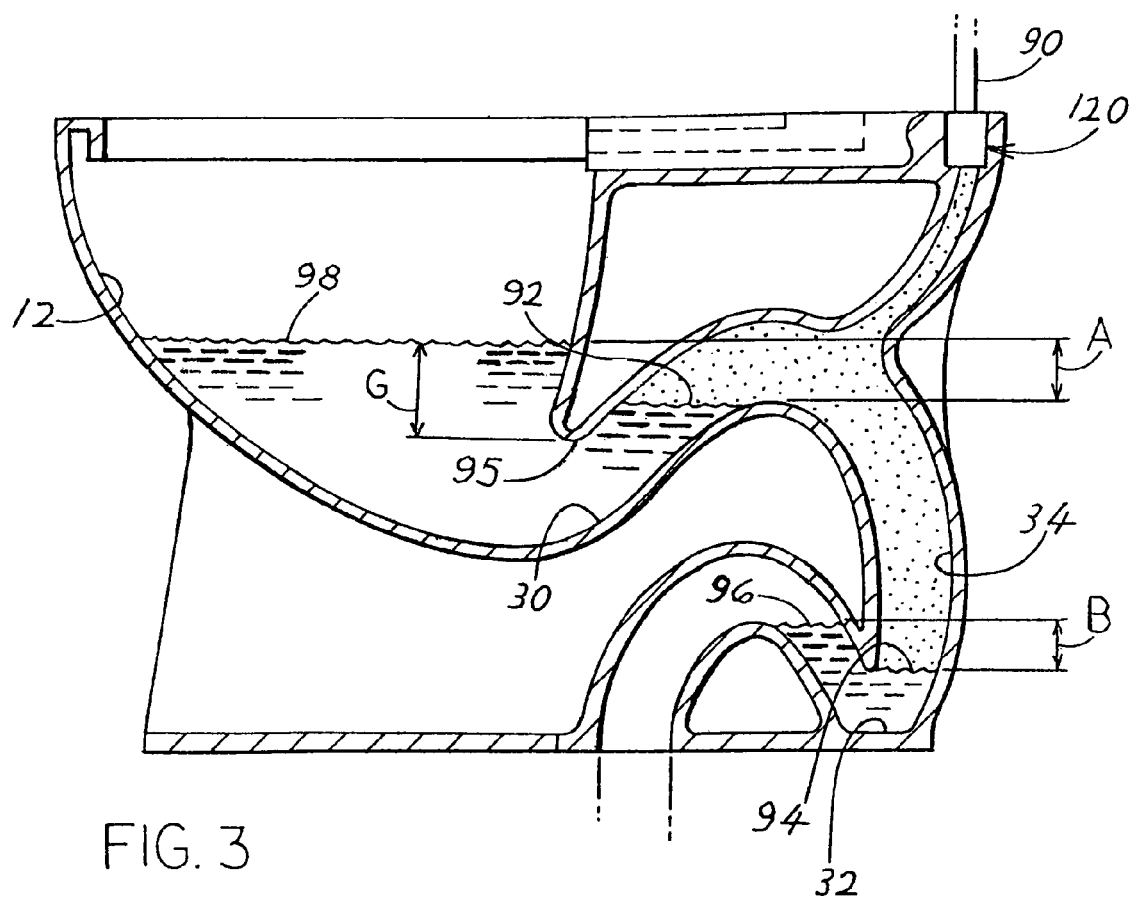
FIG. 3 is a sectional view of the lower portion of the toilet of FIG. 1, shown prior to a flushing.

FIG. 3 shows the trapway passage 34 that extends between the upper and lower traps 30, 32, before a flushing when the trapway passage contains pressured air. The pressured air raises the level of water in the toilet bowl 12, to create a water spot 98 of increased area and to increase the volume of water in the toilet bowl. The top of the water spot lies a distance A above the level of water 92 at the downstream end of the upper trap, where the distance A is equal (within 5 mm) to the air pressure of water in the trapway passage. The level 94 in the upstream end of the lower trap 32 lies a distance B below the level of water 96 in the downstream end of the lower trap, where B is equal to A. The trapway has a diameter of about 50 millimeters. The height G of a full water spot above the bottom 95 of the upper trap top wall is at least 50 millimeters so small objects are covered by water, and to assure that the height G does not fall to zero and allow sewer gas to enter the bathroom. Applicant's height G is actually 60 millimeters.

Applicant has found that occasionally all water leaves the toilet bowl. Such "mysterious" loss of water in the toilet bowl resulting from loss of air pressure in the trapway, can be avoided by increasing the volume of pressured air connected to the trapway so a loss of a small amount of pressured air does not significantly reduce air pressure.

FIG. 2 shows how applicant obtains a large volume of pressured air that is connected through the conduit 90 to the trapway passage. The tank filled level 52 of water in the tank is about 20 centimeters above the bottom 53 of the tank. Early during each flushing the level of water in the air-water container 100 rapidly drops, from 86 to nearly 84, and a vacuum fills the container down to about the level 84. The vacuum is applied through conduit 90 and a coupling 120 to the trapway passage 34 (FIG. 3) to very rapidly (usually 1 to 2 seconds after the flush valve is opened) syphon out the contents of the toilet bowl into the trapway passage, before the syphon breaks. After the beginning of a flushing, the water level in the container 100 (FIG. 2) slowly (during about 30 seconds) rises towards the container fill level 86. Water rises by a height C of about 10 centimeters and tends to pressurize air in the container upper portion to a pressure of about 3 centimeters of water. Toward the end of a flushing any air pressure in excess of about 1.5 centimeters of water (0.02 psi) escapes though the conduit 90 and the lower trap, until the pressure in the container upper portion 82 falls to the desired level of about 1.5 cm. of water.

Applicant obtains a large volume of pressured air in the upper portion of container 100, by locating the top at 102 of the container cavity upper portion above the tank filled height 52 and preferably at least one centimeter above the tank filled height. A container side 104 is widely spaced from the divider 140. Applicant prefers that the volume of water in the container between levels 86 and 84 be at least as great as the volume of the trapway passage to apply a significant vacuum at the beginning of a flushing.

Applicant stores a volume of pressured air in the container 100 of at least 30% of the trapway passage plus conduit volume, and prefers to store a volume of at least 50% of trapway passage plus conduit volume in the container. The height of the container cavity top must lie above the height 86 of the container filled level, and preferably lies above the tank filled waterline 52.

The passage of water to the toilet bowl may last several seconds. During the first second or two, there is a large flow rate of water from within the isolator through the flush valve and from container 100 to the flush valve. The large flow plus the vacuum from container 100 causes water and debris in the toilet bowl to be rapidly siphoned out to complete a flushing. The flow rate suddenly slows as the height of water in the isolator drops to a low level, and the flush valve closes. However, a limited amount of water flows from the closing flush valve and from the water tunnel 26 and toilet bowl channel 28. This fills the traps and creates the water spot 98 in the toilet bowl. An excessive flow near the end of a flushing wastes water. Applicant constructs the tank-isolator hole 64 (FIG. 2) so its diameter (cross-section) can be easily varied by the manufacturer, or by a plumber or homeowner. Applicant provides a plug 110 with a large hole. If insufficient water is filling the traps before the flush valve member closes, then the plug can be removed to increase the flow of water near the end of a flushing. If too much water flows, a plug with a smaller hole can be substituted.

In the case of a low water flush (e.g. 1.5 liters) when only water at 58 (not at 61) passes out through the flush valve, the water at 58 drops rapidly and water flow to the toilet bowl stops earlier during a flushing. As a result, a flushing (the contents of the toilet bowl are removed) and a syphon break occurs earlier, and a larger portion of the 1.5 liters of water is used to replenish the water spot.

Thus, the invention provides a container 100 that stores water and air between flushings, and generates a vacuum to start a flushing that ends a short time after the flush valve is opened. A divider 140 divides the volume within the isolator 40 into third and fourth volumes 58, 61 and an air valve 142 can be manually operated to select a full flush (3 liters) or a low water flush (1.5 liters).

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A toilet that includes a toilet bowl, a toilet tank that holds a first quantity (62) of water but does not release most of it in a flushing, a fill valve in said tank that flows water into said tank at each flushing until a predetermined tank full level is reached and air remains in the top of the tank, and a flush valve that releases water into said toilet bowl in each flushing, comprising:

a source (42) that stores a second quantity of water (86) and releases a majority of it to the toilet bowl in each flushing;

an isolator (40) that lies in said tank, that holds a quantity of water that is isolated from water in said tank and that has a lower end that extends around said flush valve, so most of the water used in each flushing is limited to water within said isolator and said source;

a divider (140) that divides the volume in said isolator into third and fourth quantities (61, 58) that both contain water before each flushing, said fourth quantity (58) being continuously connected to air in the top of said tank so water flows from said first volume through said flush valve in each flushing;

said third quantity (61) of water of said isolator is connected through valve apparatus (142) to environmental air, said valve apparatus being manually operable to allow air to flow into the third quantity or to not allow air to flow into the third quantity.

2. A toilet which includes a toilet bowl (12), a toilet tank (22) that directly holds a first quantity of water (62), a trapway (14) that includes upper and lower traps (30, 32) that connect said toilet bowl to a drain 16, and a flush valve (24) that moves at least partially along a vertical axis (107) and that releases water to flow through a water tunnel (26) to said toilet bowl to flush said toilet bowl, comprising:

an isolator (40) lying in said tank that holds third (61) and fourth (58) quantities of water in close proximity to said flush valve, to flow said third and/or said fourth quantities of water rapidly to said bowl at the beginning of a flushing;

a source (42) that applies a vacuum to said trapway immediately after said flush valve opens and that holds a second quantity of water (86), and that prevents said first quantity of water (86) from rapidly flowing through said flush valve in a flushing;

said isolator comprises an outer cylinder (59) with a vertical axis (107), and an inner cylinder (140) that lies concentric within said outer cylinder (59) and that extends completely about said axis (107), to divide water into said third and fourth quantities of water and position them so said fourth quantity (58) of water lies directly in contact with and around said flush valve (24) and said third quantity (61) of water lies around said fourth quantity (58) of water but is isolated therefrom except at the bottoms of said third and fourth quantities of water.

3. The toilet described in claim 2 including:

one of said quantities (61) of water is connected through a valve apparatus (142) to air in a top of said tank, said valve apparatus including a manually operated valve part (144) that allows a manual selection to allow or not allow air to flow into said third volume.

\* \* \* \* \*